(12) United States Patent
Matsuura et al.

(10) Patent No.: US 11,125,291 B2
(45) Date of Patent: Sep. 21, 2021

(54) PARKING BRAKE APPARATUS FOR VEHICLE

(71) Applicant: KANZAKI KOKYUKOKI MFG. CO., LTD., Amagasaki (JP)

(72) Inventors: Jun Matsuura, Amagasaki (JP); Toshifumi Yasuda, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 132 days.

(21) Appl. No.: 16/247,101

(22) Filed: Jan. 14, 2019

(65) Prior Publication Data

US 2019/0219116 A1    Jul. 18, 2019

(30) Foreign Application Priority Data

Jan. 15, 2018  (JP) .............................. JP2018-004330

(51) Int. Cl.
| | | |
|---|---|---|
| *A01D 69/10* | (2006.01) | |
| *F16D 65/16* | (2006.01) | |
| *B60T 1/06* | (2006.01) | |
| *F16D 125/58* | (2012.01) | |
| *F16D 125/70* | (2012.01) | |
| *F16D 121/24* | (2012.01) | |

(52) U.S. Cl.
CPC .............. *F16D 65/16* (2013.01); *B60T 1/062* (2013.01); *F16D 2121/24* (2013.01); *F16D 2125/582* (2013.01); *F16D 2125/70* (2013.01)

(58) Field of Classification Search
CPC ................. F16D 65/16; F16D 2121/24; F16D 2125/582; F16D 2125/70; B60T 1/062; B60T 1/005; B60T 7/085; B60T 7/101; B60T 7/102; B60T 7/104; A01D 69/10
USPC ........................................................ 188/107
See application file for complete search history.

(56) References Cited

U.S. PATENT DOCUMENTS

| | | | | |
|---|---|---|---|---|
| 1,795,299 | A | * | 3/1931 | Leon ....................... B60T 11/10 188/152 |
| 2,664,973 | A | * | 1/1954 | Colley ................... B60T 11/102 188/106 R |
| 3,220,189 | A | * | 11/1965 | Caramanna ............. B60T 11/06 60/581 |

(Continued)

*Primary Examiner* — Thomas W Irvin
(74) *Attorney, Agent, or Firm* — Sterne, Kessler, Goldstein & Fox P.L.L.C.

(57) ABSTRACT

Provided is a parking brake apparatus for a vehicle that allows an improvement in the ease of assembly during manufacturing. A parking brake apparatus for a work vehicle having wet brake mechanisms for restricting rotation of right and left axles and is able to simultaneously apply or release brakes via brake arms for the right and left transaxles. The parking brake apparatus includes a parking brake pedal for artificially providing a parking instruction, an electric actuator having a displacement portion that is displaced in response to the parking instruction, and a link mechanism connecting the displacement portion and the brake arms. The link mechanism includes auxiliary brake rods connected at first end portions to the brake arms, an equalizer connected to second end portions of the auxiliary brake rods, and a single principal brake rod connected at a first end portion to a substantially central portion of the equalizer and connected at a second end portion to the displacement portion.

16 Claims, 13 Drawing Sheets

(56) References Cited

U.S. PATENT DOCUMENTS

| | | | | |
|---|---|---|---|---|
| 4,088,209 | A * | 5/1978 | Drone | B60T 7/02 |
| | | | | 180/6.2 |
| 5,251,968 | A * | 10/1993 | Rath | B60T 7/107 |
| | | | | 188/349 |
| 7,954,907 | B1 * | 6/2011 | Wieber | B60T 1/062 |
| | | | | 303/3 |
| 8,573,368 | B2 | 11/2013 | Stover et al. | |
| 9,180,850 | B2 * | 11/2015 | Kuramoto | B60T 11/06 |
| 10,888,047 | B2 * | 1/2021 | Yasuda | B60T 1/005 |
| 2007/0125054 | A1 * | 6/2007 | Dong | A01D 69/10 |
| | | | | 56/11.3 |
| 2007/0151222 | A1 * | 7/2007 | Iida | A01D 69/03 |
| | | | | 56/157 |
| 2009/0260912 | A1 * | 10/2009 | Isogai | E02F 9/0866 |
| | | | | 180/336 |
| 2013/0047568 | A1 * | 2/2013 | Yamada | A01D 69/10 |
| | | | | 56/14.7 |
| 2017/0086376 | A1 * | 3/2017 | Burns | A01D 34/64 |
| 2017/0247021 | A1 * | 8/2017 | Krystowski | A01D 34/006 |
| 2019/0230863 | A1 * | 8/2019 | Yasuda | B60T 13/588 |
| 2019/0270435 | A1 * | 9/2019 | Matsuura | F16D 63/006 |
| 2020/0000039 | A1 * | 1/2020 | Reese | A01D 69/10 |

\* cited by examiner

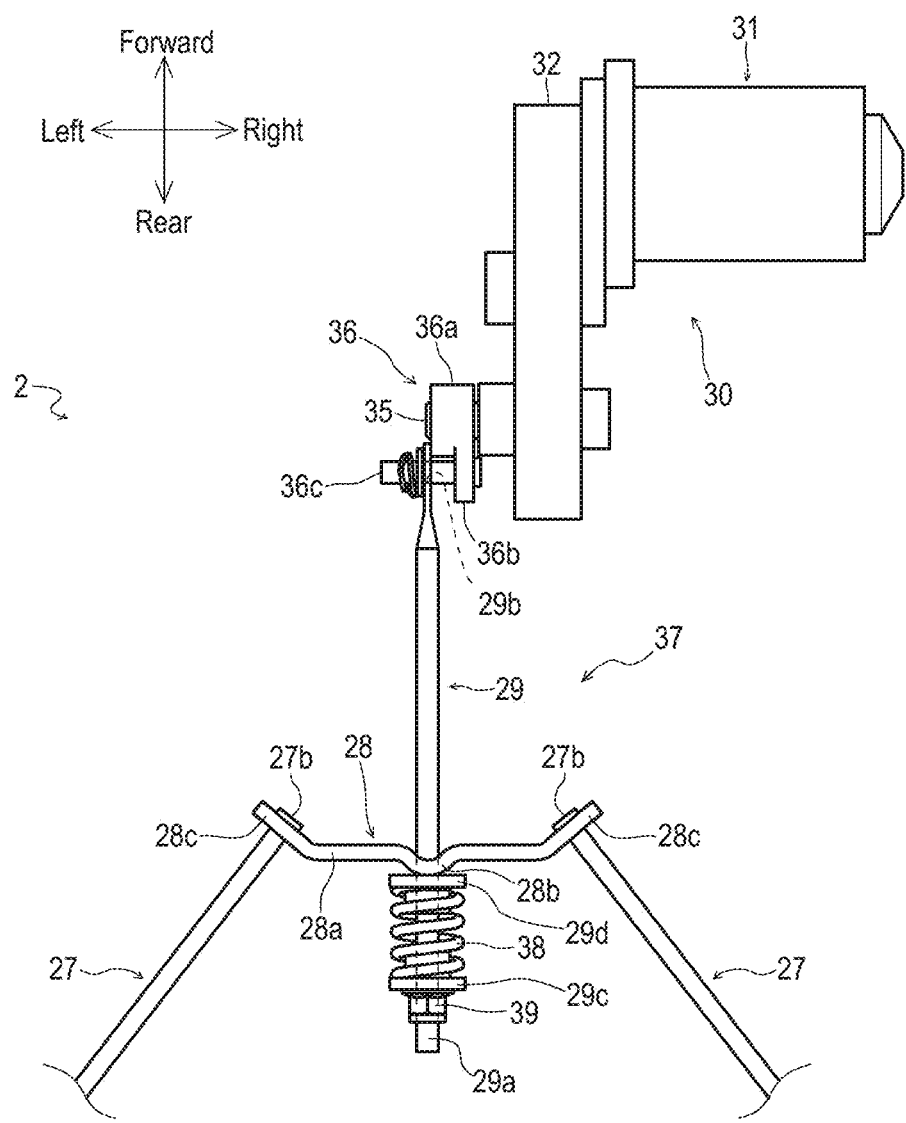

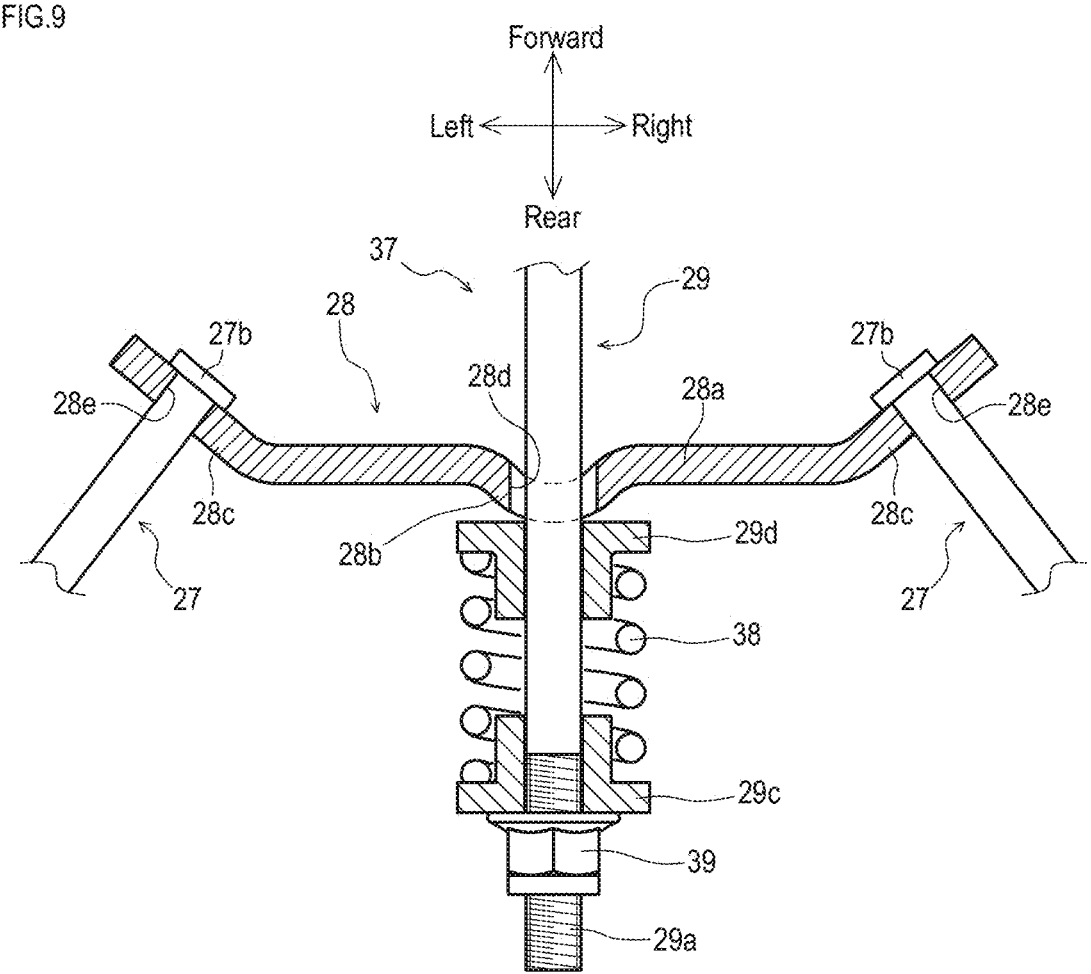

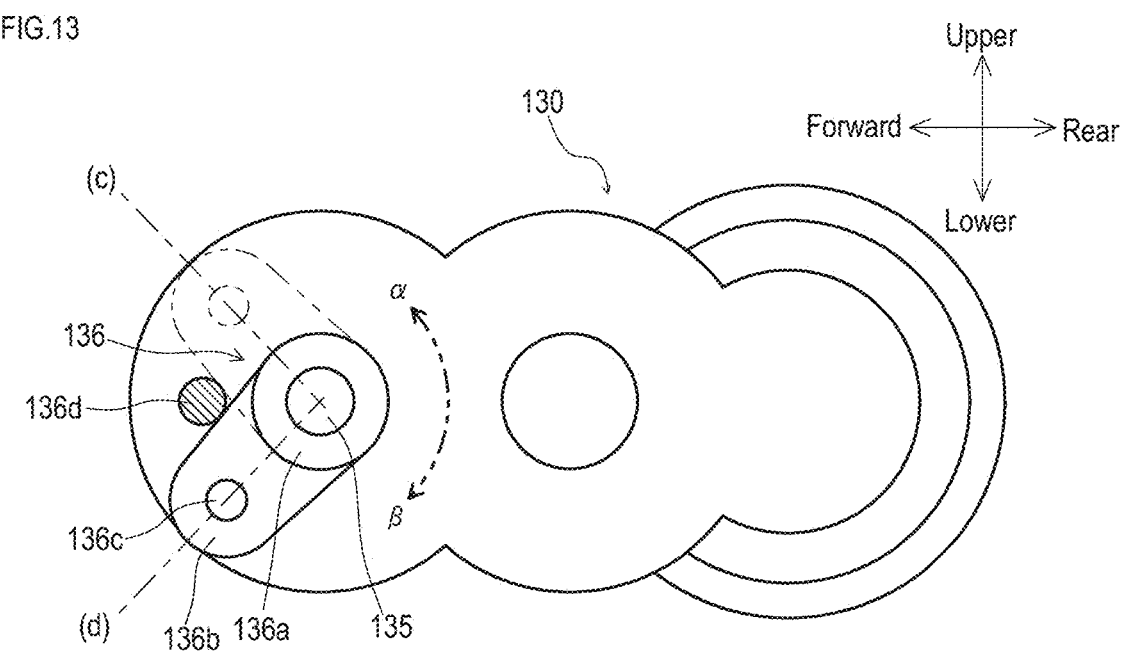

PARKING BRAKE APPARATUS FOR VEHICLE

BACKGROUND OF THE INVENTION

(1) Field of the Invention

At least one embodiment of the present invention relates to a parking brake apparatus for a vehicle with transaxles.

(2) Description of Related Art

As disclosed in U.S. Pat. No. 8,573,368B, for example, there has been known a parking brake apparatus for a vehicle having a brake unit for restricting rotation of axles and brake arms of the brake unit, for operating the brake arms simultaneously to apply or release brakes for a pair of right and left transaxles.

The parking brake apparatus as described above includes an electric actuator having a pair of displacement portions for driving brake arms, individually. The displacement portions of the electric actuator and the pair of right and left brake arms are connected by a pair of right and left brake rods. The brake arms and the rods are connected via springs, constituting equalizers for actuating both right and left parking brakes equally with reliability.

Therefore, in the parking brake apparatus having the above configuration, it is necessary to connect the pair of right and left brake rods to the electric actuator, individually, and it takes time to assemble the parking brake apparatus. In addition, the electric actuator having the pair of displacement portions is a special order product and is expensive.

SUMMARY OF THE INVENTION

The present invention has been made in view of this current problem, and provides a parking brake apparatus for a vehicle that allows an improvement in the ease of assembly.

The problem to be solved by the present invention is as described above. Next, a means for solving this problem will be described.

Specifically, a parking brake apparatus for a vehicle according to the present invention includes brake units for restricting rotation of right and left axles, wherein the brake units comprise brake arms and a brake operating portion for providing a parking instruction. Also included is an electric actuator having a displacement portion that is displaced in response to the parking instruction and a link mechanism connecting the displacement portion of the actuator and the brake arms. The link mechanism includes a first auxiliary rod connected at a first end portion to the brake arm on one side of the vehicle, a second auxiliary rod connected at a first end portion to the brake arm on the other side of the vehicle, an equalizer having first and second end portions to which a second end portion of the first auxiliary rod and a second end portion of the second auxiliary rod are connected, respectively. The equalizer is connected to the electric actuator. The parking brake apparatus is configured to simultaneously apply or release braking pressure from the brake units. In embodiments, a principal rod is connected at a first end portion of the principal rod to a central portion of the equalizer and is connected at a second end portion of the principal rod to the displacement portion of the electric actuator.

In embodiments, the link mechanism further comprises a first principal rod extending along a front-back direction of the vehicle and connected at a first end portion to a substantially central portion of the equalizer, a second principal rod extending along an up-down direction of the vehicle and connected at a first end portion to the displacement portion of the electric actuator, and a bell crank connecting a second end portion of the first principal rod and a second end portion of the second principal rod.

In the parking brake apparatus for the vehicle according to the present invention, the equalizer has a single balance arm, and the link mechanism includes an elastic member interposed between the substantially central portion of the equalizer and the first end portion of the principal rod, and connects the equalizer to the first end portion of the principal rod swingably about a vertical axis.

In the parking brake apparatus for the vehicle according to the present invention, the link mechanism includes a first elastic member interposed between the first end portion of the equalizer and the second end portion of the first auxiliary rod, and a second elastic member interposed between the second end portion of the equalizer and the second end portion of the second auxiliary rod, and the link mechanism connects the equalizer to the first end portion of the principal rod swingably about a vertical axis.

In the parking brake apparatus for the vehicle according to the present invention, the displacement portion of the electric actuator is reversibly rotated, between two positions, about an axis in a right-left direction of the vehicle, resulting in displacement of a position of the second end portion of the principal rod to two positions along a front-back direction of the vehicle.

In the parking brake apparatus for the vehicle according to the present invention, the displacement portion of the electric actuator is reversibly rotated, between two positions, about an axis in a right-left direction of the vehicle, resulting in displacement of a position of the second end portion of the first principal rod to two positions along the front-back direction of the vehicle.

As the effects of the present invention, effects as described below are achieved.

The parking brake apparatus for the vehicle according to the present invention can improve the ease of assembly. Further, the parking brake apparatus for the vehicle according to the present invention is advantageous in that a commercially available product called a wiper motor can also be used as the electric actuator.

BRIEF DESCRIPTION OF THE DRAWINGS

FIG. 7 is a partially enlarged plan view of the parking brake apparatus according to the present invention;

FIG. 9 is a cross-sectional plan view showing an equalizer;

FIG. 13 is a side view of an electric actuator constituting the parking brake apparatus according to the second embodiment.

DETAILED DESCRIPTION OF PREFERRED EMBODIMENTS

Next, an embodiment of the present invention will be described.

First, the entire configuration of a vehicle with a parking brake apparatus according to the present invention will be described.

Figure 1:
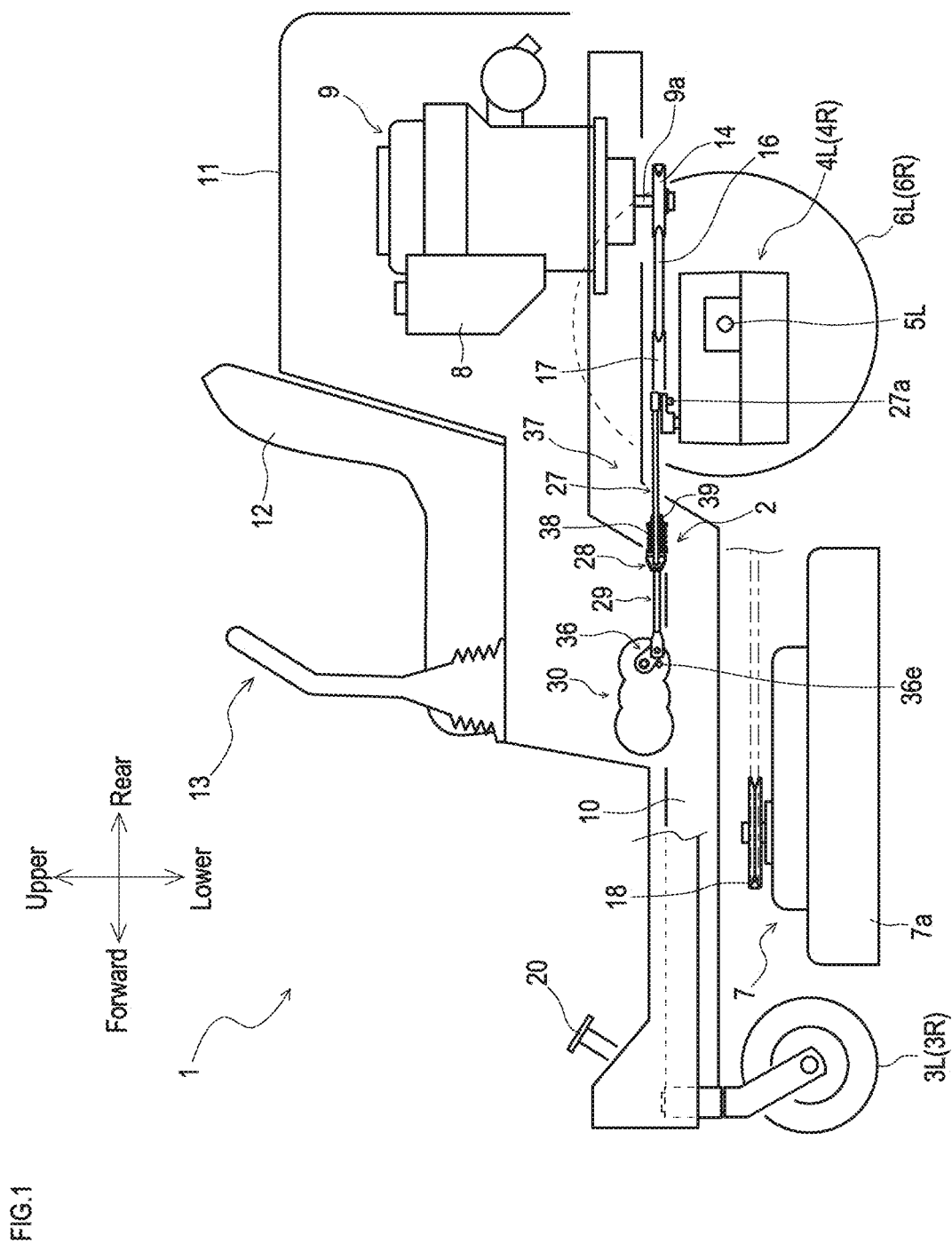
FIG. 1 is a partially cross-sectional side view showing the entire configuration of a work vehicle with a parking brake apparatus according to the present invention.
Figure 2:
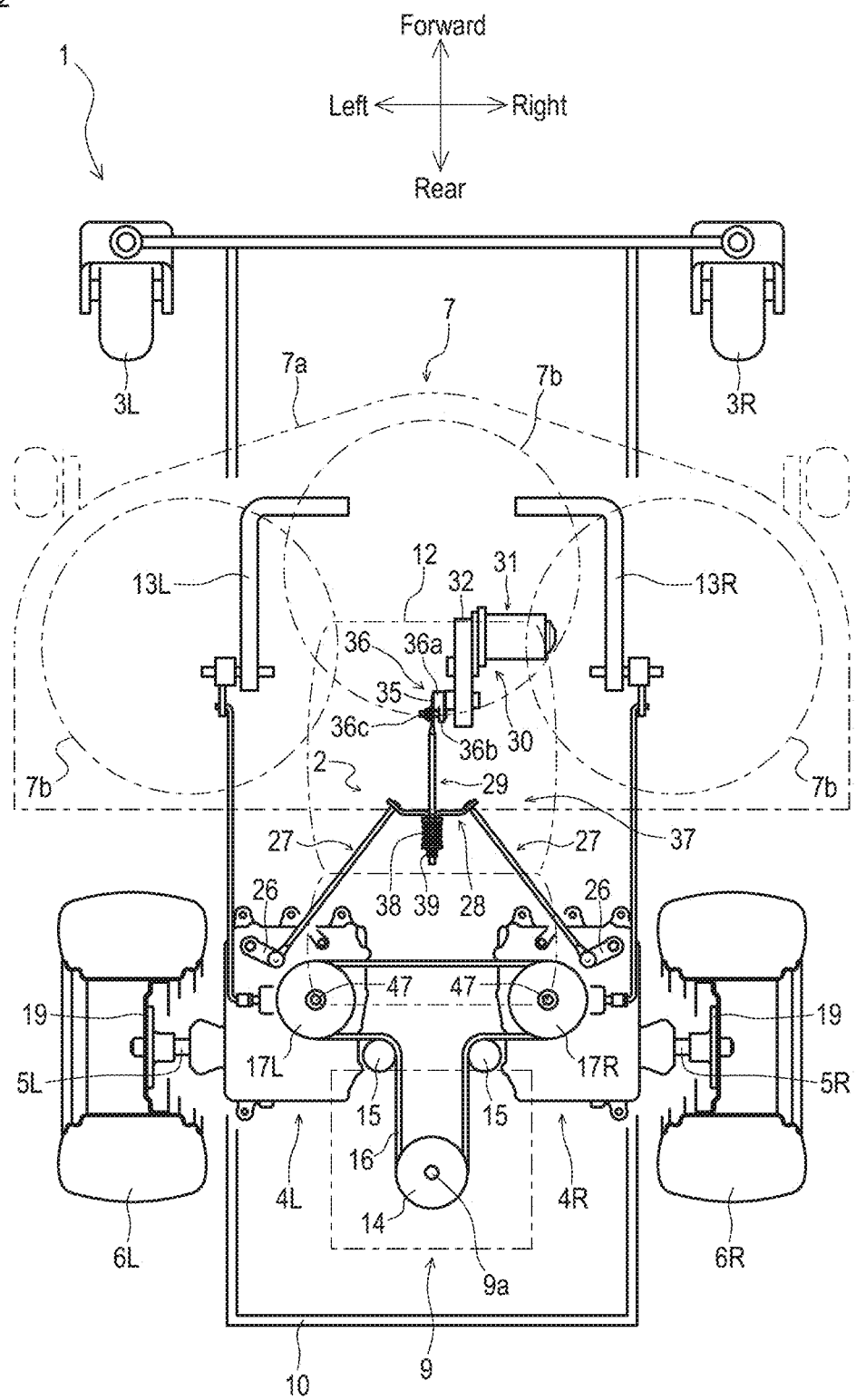
FIG. 2 is a plan view of the work vehicle with the parking brake apparatus.

A work vehicle 1 shown in FIGS. 1 and 2 is an embodiment of a vehicle with a parking brake apparatus 2 according to the present invention. In the following description, as shown in FIGS. 1 and 2, the front-back direction, the up-down direction, and the right-left direction of the work vehicle 1 are defined. In the other descriptions, the defined directions are used in common.

A riding lawn mower illustrated as an example of the work vehicle 1 has a longitudinally elongated body frame 10 extended in the front-back direction. A pair of right and left casters 3R and 3L are disposed on the right and left of a front portion of the body frame 10. The work vehicle 1 also has a pair of right and left transaxles 4R and 4L disposed on the right and left of a rear portion of the body frame 10.

From the transaxles 4R and 4L, axles 5R and 5L are protruded outward, respectively. Rear wheels 6R and 6L are fixed on outer end portions of the axles 5R and 5L, respectively. A mower 7 is provided below the body frame 10 between the rear wheels 6R and 6L and the casters 3R and 3L. A prime mover 9 such as an internal combustion engine with a fuel tank 8 provided at the front is placed on the rear portion of the body frame 10. The body frame 10 and the prime mover 9 are covered with a cover 11. A driver's seat 12 is placed on the cover 11. A pair of right and left steering levers 13R and 13L are provided at a front portion of the driver's seat 12. A parking brake pedal 20 constituting an operating portion of the parking brake apparatus 2 is provided in front of the steering levers 13R and 13L. Instead of a pedal, the operating portion may be of a lever type. Alternatively, the parking brake apparatus 2 may be actuated by simultaneously operating the steering levers 13R and 13L from a neutral position to a parking position.

A power output shaft 9a is protruded vertically downward from the prime mover 9. An upper pulley 14 is fixed on the power output shaft 9a. The upper pulley 14 is connected to input pulleys 17R and 17L of the right and left transaxles 4R and 4L via a belt 16 stretched by tension pulleys 15. Power from the prime mover 9 is transmitted to the input pulleys 17R and 17L to drive the transaxles 4R and 4L. Note that, a lower pulley (not shown) is further fixed on the power output shaft 9a. Just in front of the lower pulley, a PTO clutch system of a hydraulic clutch type (not shown) suspended from and supported by the body frame 10 is disposed. A belt (not shown) wound around the lower pulley is tensioned by a tension pulley (not shown), and is connected to an input pulley (not shown) of the PTO clutch system. An output pulley (not shown) connected to the input pulley in such a manner as to be able to be disconnected via a PTO clutch is connected to an input pulley 18 of the mower 7 via a belt (not shown), so that the mower 7 is driven by power from the prime mover 9. A plurality of blades 7b are housed in a deck 7a of the mower 7. By rotating the blades 7b, an operation of mowing a lawn or the like can be performed.

Figure 3:
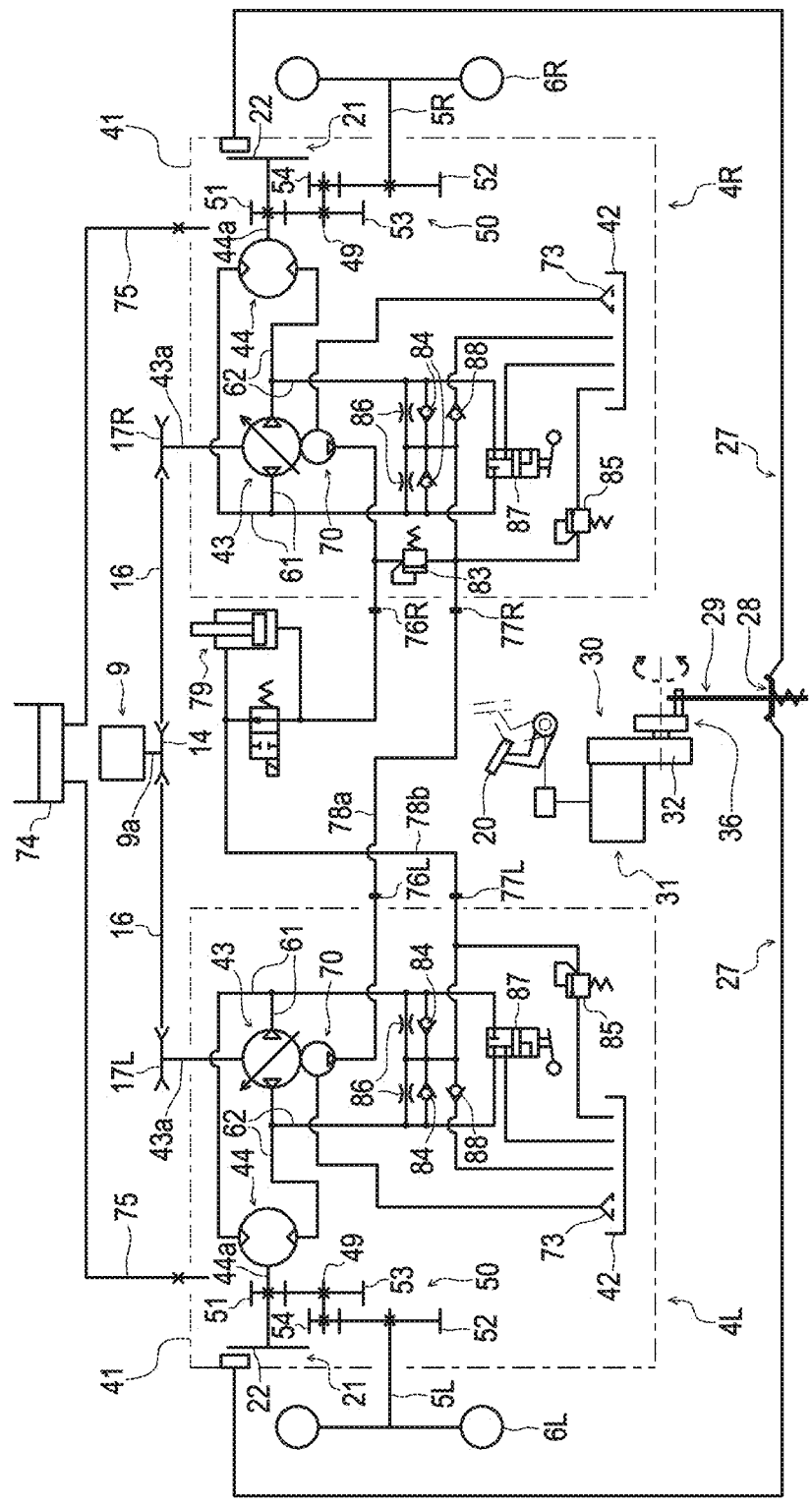
FIG. 3 is a hydraulic circuit diagram of the work vehicle with the parking brake apparatus.

Next, the transaxles 4R and 4L will be described. Note that since the right and left transaxles 4R and 4L are symmetrical to each other as shown in FIGS. 2 and 3, in the present embodiment, the right transaxle 4R will be mainly described, and for the left transaxle 4L, only differences will be described.

As shown in FIGS. 2 to 6, the transaxle 4R has a housing 41 including an upper housing half 41a and a lower housing half 41b. In the housing 41, a hydraulic pump 43 of a variable displacement type and an axial piston type, and a hydraulic motor 44 of the same axial piston type are installed. The right axle 5R is protruded rightward from the housing 41. A flange 19 connected to the rear wheel 6R is fixed on the outer end of the axle 5R. Note that the type of the pump and motor may alternatively be a radial piston type, for example.

The hydraulic pump 43 and the hydraulic motor 44 are installed in a center section 60 installed in the housing 41, and via a pair of oil passages 61 and 62 (closed circuit) provided inside the center section 60, the hydraulic pump 43 and the hydraulic motor 44 are fluidly connected to each other, thereby constituting a hydrostatic continuously variable transmission 40. The hydraulic pump 43 has a movable swash plate 45 as a volume control device. The tilt angle and tilt direction of the movable swash plate 45 are controlled to change the discharge rate and discharge direction of the hydraulic pump 43, thereby to set the rotation speed and rotation direction of the hydraulic motor 44 and the axle 5R. The hydraulic motor 44 has a fixed swash plate 46. The hydraulic pump 43 has a pump shaft 47 perpendicular to the axle 5R. The input pulley 17R is fixed on an upper portion of the pump shaft 47.

In housing the hydraulic pump 43 and the hydraulic motor 44 fluidly connected to each other in the common housing 41 in this manner, a horizontal upper surface of the center section 60 is used as a pump installation surface 60a, and the hydraulic pump 43 is installed on the pump installation surface 60a. The pump shaft 47 of the hydraulic pump 43 is protruded upward from an upper portion of the housing 41 in a direction at right angles to the axle 5R. To the pump shaft 47, rotational power from the power output shaft 9a is transmitted via the input pulley 17R.

Further, a vertical side surface of the center section 60 is used as a motor installation surface 60b, and the hydraulic motor 44 is installed on the motor installation surface 60b. In the housing 41, a motor shaft 48 of the hydraulic motor 44 and a countershaft 49 are provided in parallel to the axle 5R, and a reduction gear train 50 is installed from the motor shaft 48 to the axle 5R. In the reduction gear train 50, a motor output gear 51 is fixed on the motor shaft 48, a bull gear 52 is fixed on the axle 5R, a large-diameter gear 53 is provided on the countershaft 49 and engaged with the motor output gear 51, and a small-diameter final pinion 54 is provided on the countershaft 49 and engaged with the bull gear 52, so that variable-speed power from the hydraulic motor 44 is decelerated to be transmitted to the axle 5R.

The pair of steering levers 13R and 13L are connected to the movable swash plates 45 and 45 of the hydraulic pumps 43 and 43 in the transaxles 4R and 4L, respectively. By tilting the steering levers 13R and 13L in the same direction at the same angle, both of the hydraulic pumps 43 and 43 are changed in volume by the same amount, and the right and left hydraulic motors 44 and 44 that have received the discharged oil output the same number of revolutions, so that the body proceeds straight in the front-back direction. By tilting the steering levers 13R and 13L in different directions or at different angles, the volumes of the right and left hydraulic pumps 43 and 43 become different, and the right and left hydraulic motors 44 and 44 that have received the discharged oil output different numbers of revolutions, so that the right and left axles 5R and 5L have different numbers of revolutions, and the body changes the path in the right-left direction.

Here, the parking brake apparatus 2 provided in the work vehicle 1 will be described.

As shown in FIGS. 2 to 6, the parking brake apparatus 2 is an embodiment of the parking brake apparatus according to the present invention, and includes the parking brake pedal 20, wet brake mechanisms 21, brake arms 26, auxiliary brake rods 27, an equalizer 28, a principal brake rod 29, and an electric actuator 30.

As shown in FIG. 1, the parking brake pedal 20 is a part for the driver to artificially provide a parking instruction, and is provided pivotably in front of the driver's seat 12, protruding upward from the body frame 10. When the driver depresses the parking brake pedal 20 and holds it mechanically, the parking brake apparatus 2 is actuated. When the driver depresses the parking brake pedal 20 again to cancel the holding state, the parking brake apparatus 2 is released. A depressed position and a non-depressed position of the pedal are identified by a sensor not shown. When a signal of this identification and a signal of parking or non-parking from a different part match, a controller not shown drives a displacement portion of the electric actuator described later to one of two positions.

Figure 4:
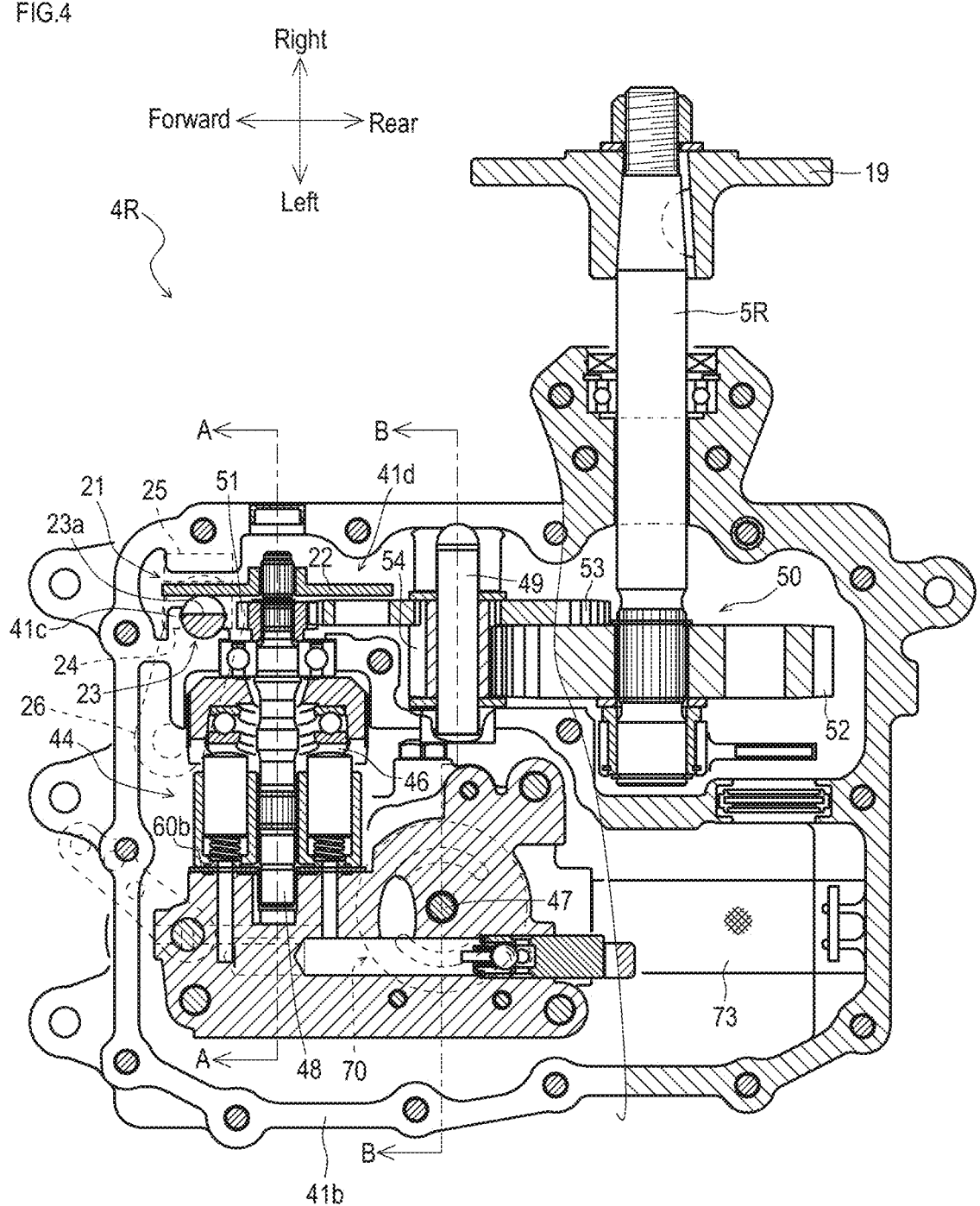
FIG. 4 is a cross-sectional plan view of a right transaxle.
Figure 5:
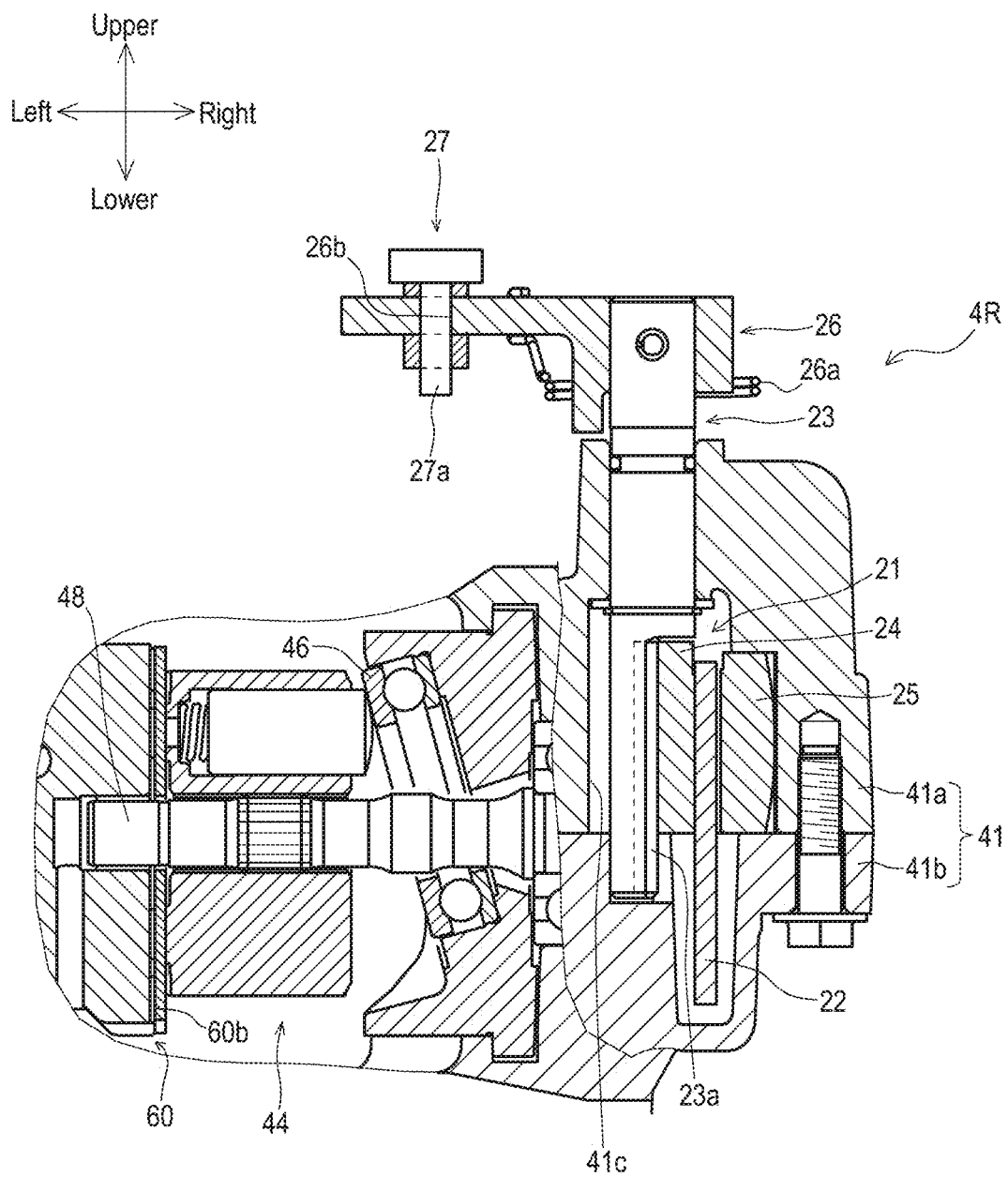
FIG. 5 is a cross-sectional view taken along line A-A in FIG. 4.
Figure 6:
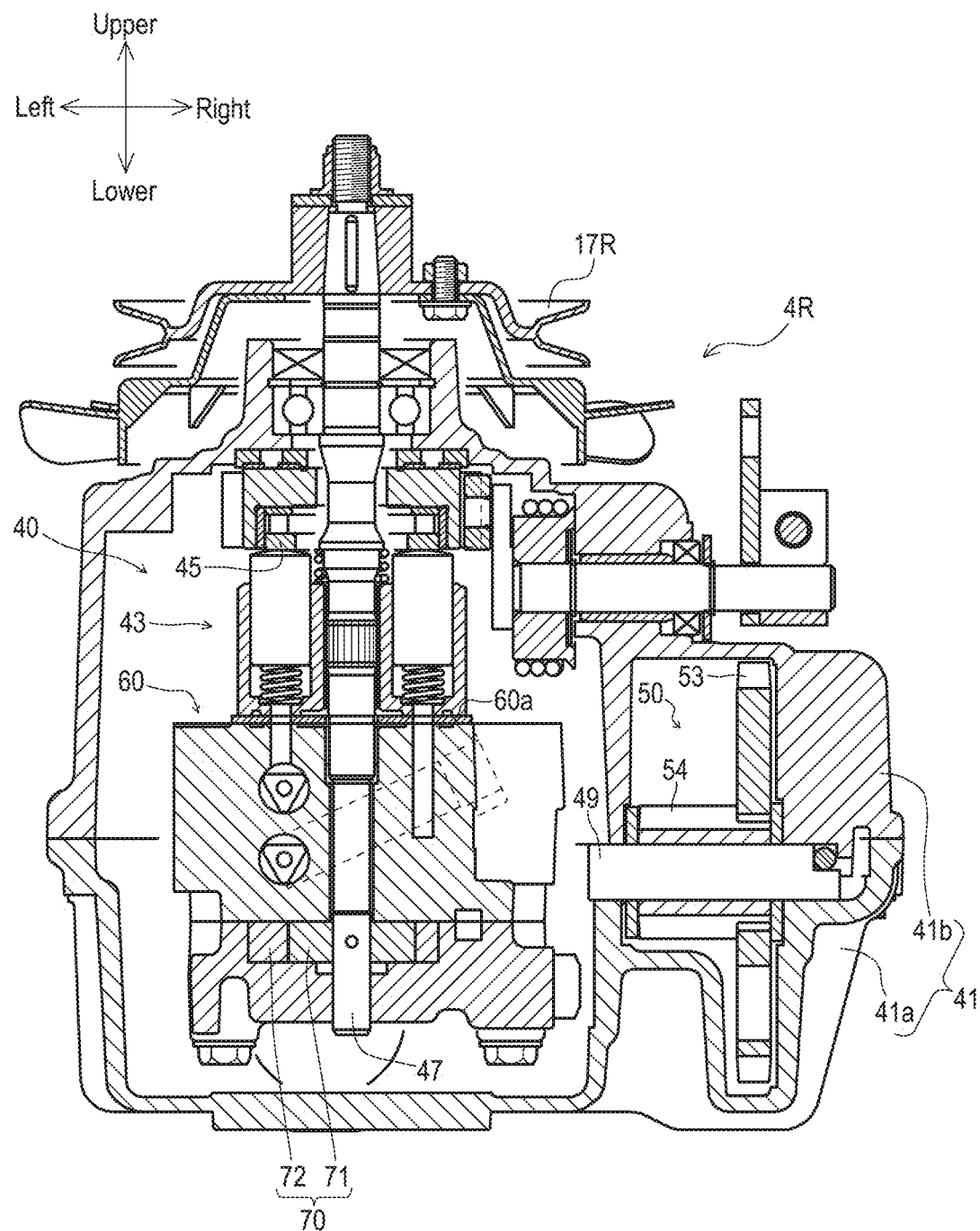
FIG. 6 is a cross-sectional view taken along line B-B in FIG. 4.

As shown in FIGS. 3 to 5, one of the wet brake mechanisms 21 is provided in the housing 41 of the transaxle 4R. A brake rotor 22 is fixed on a portion of the motor shaft 48 protruding from the motor output gear 51. A vertical brake camshaft 23 is provided between the brake rotor 22 and a partition wall 41c on the left side thereof, with a vertical middle portion pivotably supported in the upper housing half 41a. A lower portion of the brake camshaft 23 is formed as a semicircular cam portion in a cross-sectional plan view. During non-braking, a vertical flat face 23a thereof face the brake rotor 22 in parallel by an urging force of a return spring 26a.

A brake shoe 24 having a substantially U shape in a plan view is disposed between the vertical flat face 23a of the brake camshaft 23 and the brake rotor 22, surrounding the cam portion of the brake camshaft 23. A brake pad 25 is disposed between the brake rotor 22 and an outer wall of the upper housing half 41a on the right side of the brake rotor 22. The brake camshaft 23 is protruded upward from the upper housing half 41a, and the brake arm 26 is fixed on the protruding end thereof. The brake arm 26 is designed to be able to set a braking position and a non-braking position by its pivoting direction at a top surface of the upper housing half 41a.

Consequently, in the wet brake mechanism 21, when the brake arm 26 is set to the braking position, the vertical flat face 23a of the brake camshaft 23 becomes oblique in a plan view with respect to the brake rotor 22, one end of the vertical flat face 23a presses the brake shoe 24, the brake rotor 22 is sandwiched between the brake shoe 24 and the brake pad 25, and the motor shaft 48 is braked. When the brake arm 26 is set to the non-braking position, the vertical flat face 23a of the brake camshaft 23 becomes parallel to the brake shoe 24 and the brake rotor 22, the brake shoe 24 is separated from the brake rotor 22, and the motor shaft 48 becomes rotatable. The wet brake mechanisms constituting the parking brake apparatus 2 are not limited to a friction type in which a fixing pad is pressed against the surface of a brake pad as in the present embodiment, and, for example, may be of a lock type in which recessed portions are formed at equal intervals on the peripheral surface of a brake pad, and a fixing portion is fitted into the recessed portions.

As shown in FIGS. 1 and 2, first ends of the auxiliary brake rods 27 are connected to distal end portions of the brake arms 26. In the work vehicle 1, the first ends of the pair of right and left auxiliary brake rods 27 and 27 are connected to the brake arms 26 and 26 of the pair of right and left transaxles 4R and 4L, and second ends of the auxiliary brake rods 27 and 27 are connected to the common equalizer 28.

Further, as shown in FIG. 7, a first end of the single principal brake rod 29 is connected to the equalizer 28. A second end of the principal brake rod 29 is connected to the electric actuator 30. In the brake mechanism 21, the auxiliary brake rods 27, the equalizer 28, and the principal brake rod 29 constitute a link mechanism 37 that connects the brake arms 26 and the electric actuator 30.

Figure 8A:
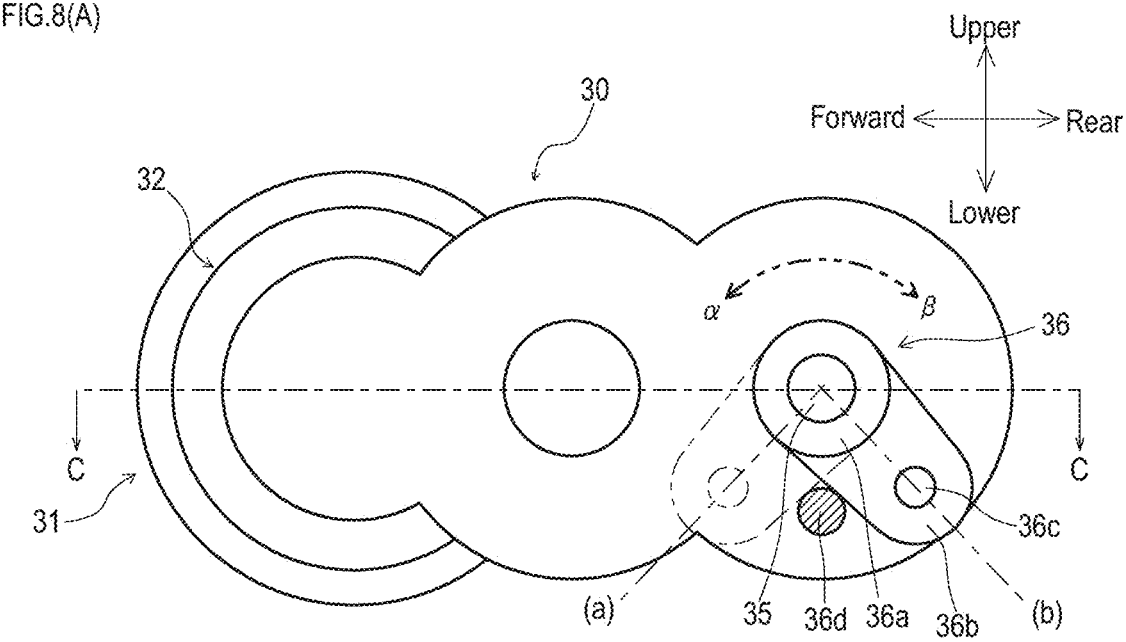
FIG. 8A is a side view of an electric actuator.
Figure 8B:
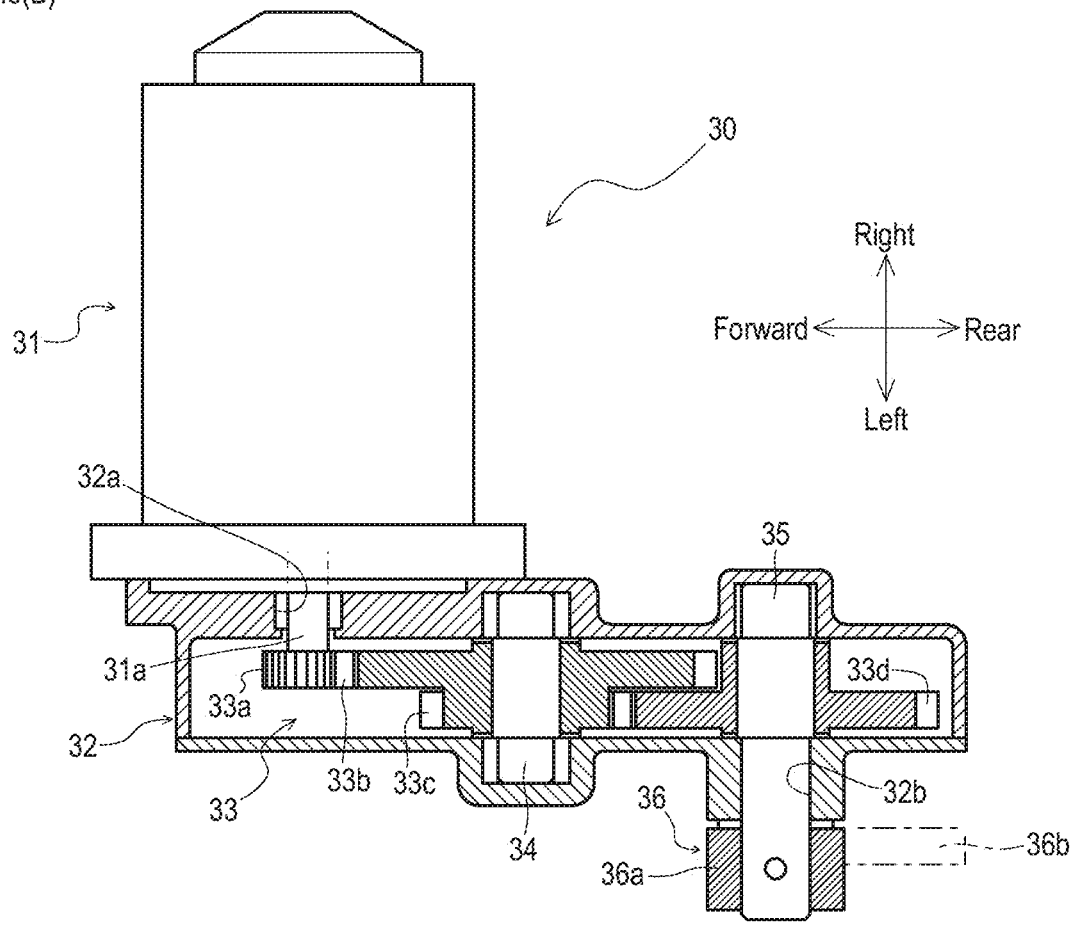
FIG. 8B is a cross-sectional view taken along line C-C in FIG. 8A.

As shown in FIGS. 8A and 8B, the electric actuator 30 is a device serving as a drive source of the electrically actuated parking brake apparatus 2, and includes a motor 31, a case 32, a gear train 33, a countershaft 34, an output shaft 35, and a displacement portion 36. The gear train 33 is housed in the case 32 attached to the motor 31. The countershaft 34 and the output shaft 35 are rotatably supported by the case 32. A motor shaft 31a of the motor 31 is inserted into the case 32 through a shaft hole 32a formed in the case 32. The output shaft 35 is protruded outside of the case 32 through a shaft hole 32b formed in the case 32.

The gear train 33 includes a motor gear 33a fixed on the motor shaft 31a of the motor 31, a counter gear 33b and a pinion gear 33c fixed on the countershaft 34, and an output gear 33d fixed on the output shaft 35. The driving force of the motor 31 is inputted to the gear train 33 from the motor gear 33a, and the rotational force is transmitted to the output gear 33d via the counter gear 33b and the pinion gear 33c. As a result, the driving force of the motor 31 is decelerated by the gear train 33 and then outputted from the output shaft 35.

As shown in FIG. 8A, the displacement portion 36 is a part displaceable to two positions, a first position (a) and a second position (b), and includes a boss 36a, an arm 36b, and a shaft 36c. The boss 36a is a substantially cylindrical part having a boss hole, and is coaxially fixed on the output shaft 35. The arm 36b is a part protruded from the boss 36a in a direction orthogonal to the axial direction of the boss 36a. The shaft 36c is a shaft member provided at a distal end portion of the arm 36b. The axial direction of the shaft 36c is set parallel to the axial direction of the output shaft 35.

The shaft 36c of the displacement portion 36 is a part rotatable about the axis of the output shaft 35 disposed laterally horizontally. With the forward or reverse rotation of the output shaft 35, the shaft 36c is displaced in the front-back direction from the first position to the second position or from the second position to the first position at an angle (range) from about −45 degrees to 225 degrees, drawing an arc-shaped locus. Consequently, the principal brake rod 29 connected to the shaft 36c is displaced substantially in the front-back direction in accordance with the movement of the displacement portion 36. Reference numeral 36d denotes a pin that defines the angle (range).

Here, the equalizer 28 will be described in detail.

As shown in FIGS. 7 and 9, the equalizer 28 is for actuating the right and left brakes equally, and is constituted by a balance arm 28a. The balance arm 28a is an arm member with both end portions of a rectangular flat plate bent in a substantially arcuate shape. The balance arm 28a has a hemispherical protruding portion 28b formed at the center in the length direction, and bent portions 28c and 28c formed at the both end portions in the length direction. The balance arm 28a also has a through hole 28d formed at the apex of the protruding portion 28b, passing therethrough in the plate thickness direction, and through holes 28e formed near the center of the bent portions 28c, passing therethrough in the plate thickness direction. The through hole 28d is a hole into which the principal brake rod 29 is inserted. The through holes 28e are holes to which the auxiliary brake rods 27 are fixed.

At a first-side end portion of each auxiliary brake rod 27, an engaging portion 27a that is a rod-shaped part orthogonal to the axial direction of the auxiliary brake rod 27 is formed, and at a second-side end portion, an enlarged-diameter portion 27b with a diameter larger than the inner diameter of the through hole 28e is formed. Each auxiliary brake rod 27 is disposed by being inserted into the through hole 28e from the engaging portion 27a side, and further inserted to a position where the enlarged-diameter portion 27b abuts the bent portion 28c, and then engaging the engaging portion 27a with a hole 26b of the brake arm 26. Consequently, the brake arms 26 and the equalizer 28 are connected by the auxiliary brake rods 27.

As shown in FIG. 7, the principal brake rod 29 has a threaded portion 29a formed at a first-side end portion, and is provided at a second-side end portion with a hole 29b formed in a direction orthogonal to the axial direction of the principal brake rod 29. As shown in FIG. 9, the principal brake rod 29 is inserted into the through hole 28d of the equalizer 28 from the threaded portion 29a side, and a nut 39 is screwed to the threaded portion 29a with a pair of spring receivers 29c and 29d and a compression coil type spring member 38 disposed between the spring receivers 29c and 29d slid onto the principal brake rod 29 from the threaded portion 29a side. The spring member 38 is disposed between the balance arm 28a and the nut 39 in a free length state. The protruding portion 28b at the center of the balance arm 28a is constantly in contact with the spring receiver 29d. This configuration allows the balance arm 28a to swing about an axis in the up-down direction with a point of contact between the spring receiver 29d and the protruding portion 28b as a supporting point.

Figure 10A:
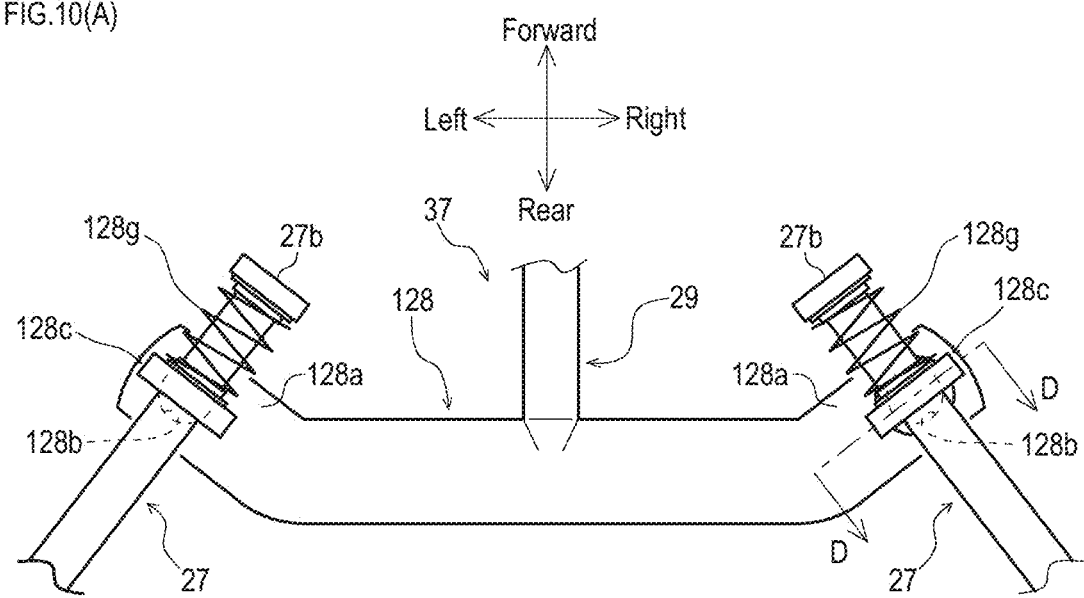
FIG. 10A is a plan view showing another embodiment of the equalizer.
Figure 10B:
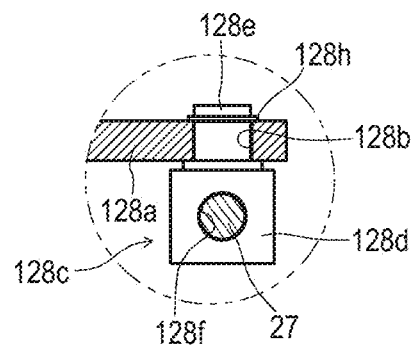
FIG. 10B is a cross-sectional view taken along line D-D in FIG. 10A.

It should be noted that the parking brake apparatus 2 may be configured by using an equalizer 128 configured as shown in FIGS. 10A and 10B, instead of the equalizer 28.

As shown in FIG. 10, the equalizer 128 according to another embodiment is a member of a rectangular flat plate bent into a substantially arcuate shape, and has bent portions 128a and 128a formed at both end portions in the length direction, and through holes 128b formed near the center of the bent portions 128a, passing therethrough in the plate thickness direction. The equalizer 128 is formed integrally with the principal brake rod 29, with an end portion of the principal brake rod 29 fixed directly to a central portion of the equalizer 128 in the length direction. The equalizer 128 has support members 128c pivotably supported in the through holes 128b. The support members 128c are members for supporting the auxiliary brake rods 27, and each includes a plate-shaped support portion 128d and a shaft 128e having an axis orthogonal to the plate thickness direction of the support portion 128d. The support members 128c each have a support hole 128f in substantially the center of the support portion 128d, passing therethrough in the plate thickness direction. The axis of the support hole 128f and the axis of the shaft 128e intersect at right angles as viewed in the axial direction of the shaft 128e. The support hole 128f is a hole into which the auxiliary brake rod 27 is inserted. Each support member 128c is disposed by inserting the shaft 128e into the through hole 128b, with the auxiliary brake rod 27 being inserted into the support hole 128f, to be rotatable about the axis of the through hole 128b.

Each auxiliary brake rod 27 is disposed by inserting it into the support hole 128f from the engaging portion 27a side with a spring member 128g provided thereon, and hooking the engaging portion 27a to the hole 26b of the brake arm 26 with the spring member 128g disposed between the support member 128c and the enlarged-diameter portion 27b. As a result, the brake arms 26 and the equalizer 128 are connected by the auxiliary brake rods 27. Note that a retaining member 128h for preventing the shaft 128e from coming out of the through hole 128b is disposed at a distal end portion of the shaft 128e that is inserted into the through hole 128b to a predetermined depth.

Here, the configuration of a hydraulic circuit of the transaxles 4R and 4L in the parking brake apparatus 2 will be described.

As shown in FIGS. 3 to 6, charge pumps 70, which are trochoid pumps each including an inner gear 71 and an outer gear 72, are each provided on a lower surface of the center section 60. From an oil sump 42 in each housing 41, oil is sucked via an oil filter 73. An external reservoir tank 74 is externally attached to the housings 41. As the volume of the oil in each oil sump 42 expands and contracts, the oil is supplied to and discharged from the oil sump 42 via a siphon 75.

The housings 41 of the right and left transaxles 4R and 4L are provided with ports 76R, 76L, 77R, and 77L of an outwardly opening shape, which are connected to each other crosswise via oil passages 78a and 78b such as external piping, the port 76L to the port 77R, and the port 76R to the port 77L. The ports 76R and 76L are connected to the discharge side of the charge pumps 70. The ports 77R and 77L are connected to charge lines of the hydraulic continuously variable transmissions 40, and mutually supply charge oil to the transaxles 4R and 4L on the other side. Furthermore, in the present embodiment, the hydraulic oil can be supplied to an external hydraulic apparatus such as a lifting device 79 on a path of the oil passage 78b. The pressure of the lifting device 79 is adjusted by an implement pressure adjustment valve 83 provided on the transaxle 4R side.

The hydraulic oil from the ports 77R and 77L is connected to the charge lines each including a pair of charge check valves 84 and 84 connected to the oil passages 61 and 62, individually, so that the hydraulic oil can be supplied to the low pressure side of the oil passages 61 and 62 via the charge check valves 84. Charge pressure adjustment valves 85 adjust the pressure of the hydraulic oil supplied from the ports 77R and 77L to the charge check valves 84.

Each of the charge check valves 84 is provided with an orifice 86. By discharging a small amount of the hydraulic oil from the oil passage 61 or the oil passage 62 on the high pressure side via the orifice 86, a neutral range of the continuously variable transmissions 40 is expanded. When the steering lever 13R reaches within certain play including a normal neutral position, the hydraulic pressure of the oil passage 61 or the oil passage 62 immediately becomes zero, and the hydraulic motor 44 and the axles 5R and 5L are stopped reliably.

Further, each continuously variable transmission 40 is provided with a bypass valve 87. The bypass valve 87 is usually closed. When the work vehicle 1 is towed, for example, the bypass valve 87 is forcibly opened to discharge the hydraulic oil from the closed circuit to the oil sump 42, to release the hydraulic motor 44 and the axle 5L from the hydraulic pressure of the continuously variable transmission 40 to make them rotatable.

In addition, each continuously variable transmission 40 is provided with a freewheel prevention valve 88. The freewheel prevention valve 88 is connected to an oil passage between the port 77 and the charge check valves 84. As a result, even if the hydraulic oil leaks from the closed circuit of the continuously variable transmission 40, the freewheel prevention valve 88 naturally opens due to negative pressure in the closed circuit, so that the hydraulic oil can be supplied from the oil sump 42 to the closed circuit.

Next, the operation of the parking brake apparatus 2 will be described with reference to FIGS. 8A and 8B. The arm 36b illustrated shows a state where the electric actuator 30 is not actuated.

In the parking brake apparatus 2, when the driver performs an operation of depressing the parking brake pedal 20 (that is, artificially provides a parking instruction), the electric actuator 30 is actuated, and the displacement portion 36 rotates in a direction to apply the brakes about the output shaft 35 (in a direction of an arrow α in FIG. 8A). When the displacement portion 36 rotates about the output shaft 35, the shaft 36c of the displacement portion 36 is displaced, and the principal brake rod 29 and the equalizer 28 connected to the shaft 36c relatively rotatably are displaced. The shaft 36c is displaced, drawing an arc-shaped locus as viewed in the axial direction of the output shaft 35. According to the amount of displacement in the forward direction in that displacement, the principal brake rod 29 is displaced in the forward direction. When the principal brake rod 29 and the equalizer 28 are displaced in the forward direction, the pair of auxiliary brake rods 27 and 27 connected to the equalizer 28 are displaced in the forward direction by the same amount of displacement. When the auxiliary brake rods 27 and 27 are displaced in the forward direction, the brake arms 26 and 26 of the transaxles 4R and 4L are rotated to the braking positions, whereby the brakes of the parking brake apparatus 2 become effective. Reference numeral 36d denotes the pin for maintaining the forward displacement position of the arm 36b passing over a supporting point. The "supporting point" mentioned here is a position of the displacement portion 36 necessary to make the wet brake mechanism 21 work. The displacement of the displacement portion 36 to a position passing over that position is referred to as "passing over the supporting point."

Since the arm 36b makes a circular movement, just before the arm 36b fits in a position to abut the pin 36d, the principal brake rod 29 is stroked beyond a stroke necessary to apply the brake (passes over the supporting point). At this time, the spring member 38 disposed between the equalizer 28 and the principal brake rod 29 is compressed to prevent the auxiliary brake rods 27 and 27 from stroking over to prevent the brakes from being damaged.

Note that when pulling the auxiliary brake rods 27 and 27 causes the brakes of the wet brake mechanisms 21 to work at different timings on the right and left, the operating force can be continuously transmitted to the auxiliary brake rod 27 that does not work completely yet, with the balance arm 28a inclined about the protruding portion 28b.

In the parking brake apparatus 2, when the driver performs an operation of depressing the parking brake pedal 20 again from the state where the brakes of the parking brake apparatus 2 are effective (that is, artificially cancels the parking instruction), the electric actuator 30 is actuated, and the displacement portion 36 rotates about the output shaft 35 in a direction opposite to the direction when the parking brake apparatus 2 is made to work (a direction of an arrow β in FIG. 8A). When the displacement portion 36 rotates backward about the output shaft 35, the shaft 36c of the displacement portion 36 is displaced, and the principal brake rod 29 and the equalizer 28 connected to the shaft 36c relatively rotatably are displaced. The shaft 36c is displaced, drawing an arc-shaped locus as viewed in the axial direction of the output shaft 35. According to the amount of displacement in the backward direction in that displacement, the principal brake rod 29 is displaced in the backward direction. When the principal brake rod 29 and the equalizer 28 are displaced in the backward direction, the pair of auxiliary brake rods 27 and 27 connected to the equalizer 28 are displaced in the backward direction by the same amount of displacement. When the auxiliary brake rods 27 and 27 are displaced in the backward direction, the brake arms 26 and 26 of the transaxles 4R and 4L are rotated to brake release positions, whereby the parking brake apparatus 2 is released.

The parking brake apparatus 2 thus configured has a configuration in which the equalizer 28 connects the auxiliary brake rods 27 and 27 and the principal brake rod 29. It is only necessary to fit the auxiliary brake rods 27 and 27 to the brake arms 26 and 26 of the transaxles 4R and 4L, so that the ease of assembly can be improved. In addition, the equalizer 28 allows the right and left auxiliary brake rods 27 and 27 to be displaced reliably to be in a brake working state, and allows the right and left wet brake mechanisms 21 to be actuated reliably and smoothly.

The parking brake apparatus 2 uses the electric actuator 30 of a type that rotates the single displacement portion 36. In this case, it is possible to use an actuator smaller than a direct-acting actuator or the like. As a result, it is possible to reduce the size of the parking brake apparatus 2. Further, in order to maintain a state where the parking brakes are effective even when the engine of the vehicle is stopped, the displacement portion 36 is made to pass over the supporting point. When the supporting point is passed over, the principal brake rod is stroked over. However, by disposing the spring member 38 on the equalizer 28, that over stroke is absorbed and the brake working state provided by the auxiliary brake rods is maintained.

Here, a work vehicle 1 with a parking brake apparatus according to a second embodiment will be described.

Figure 11:
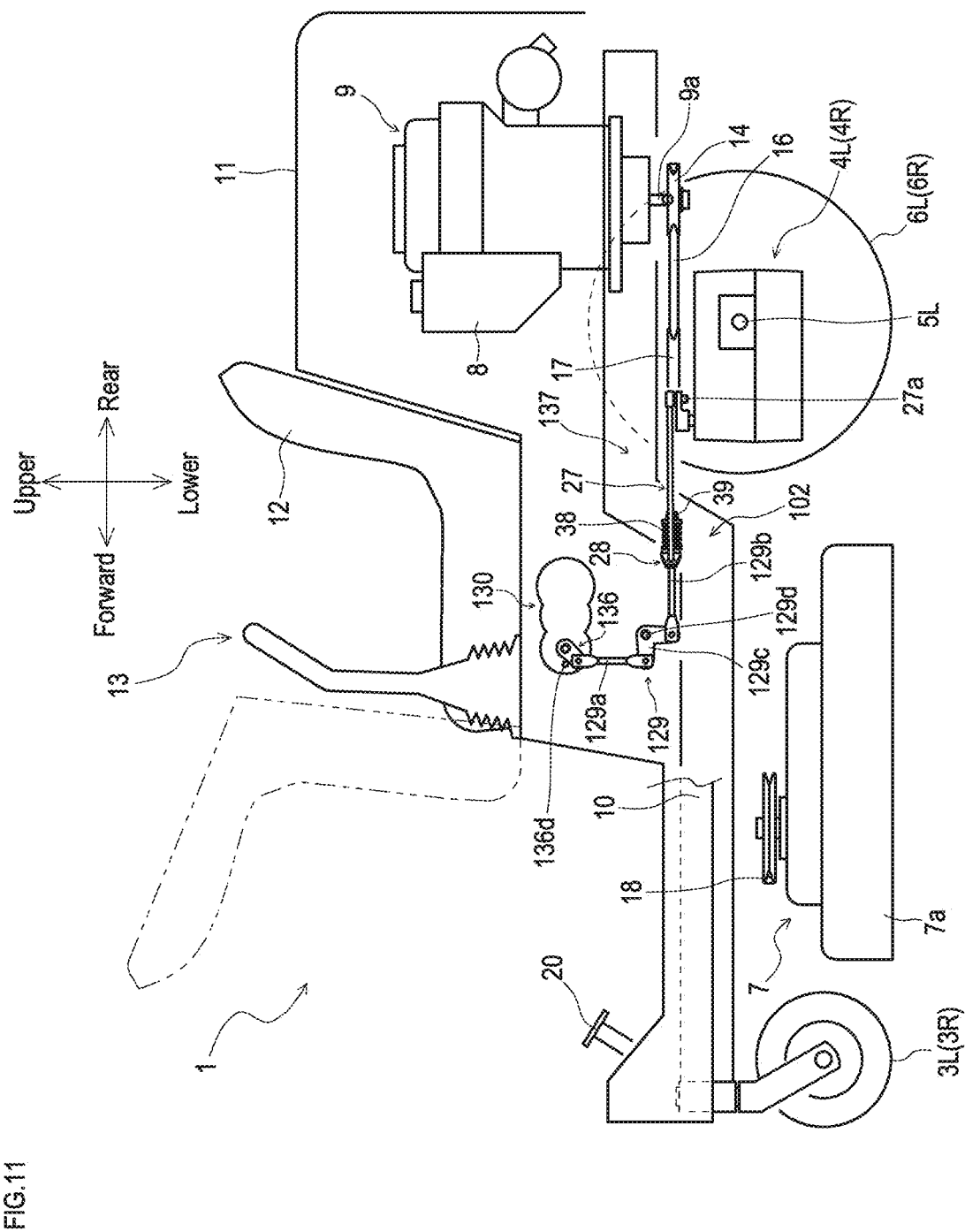
FIG. 11 is a partially cross-sectional side view showing the entire configuration of a work vehicle with a parking brake apparatus according to a second embodiment.
Figure 12:
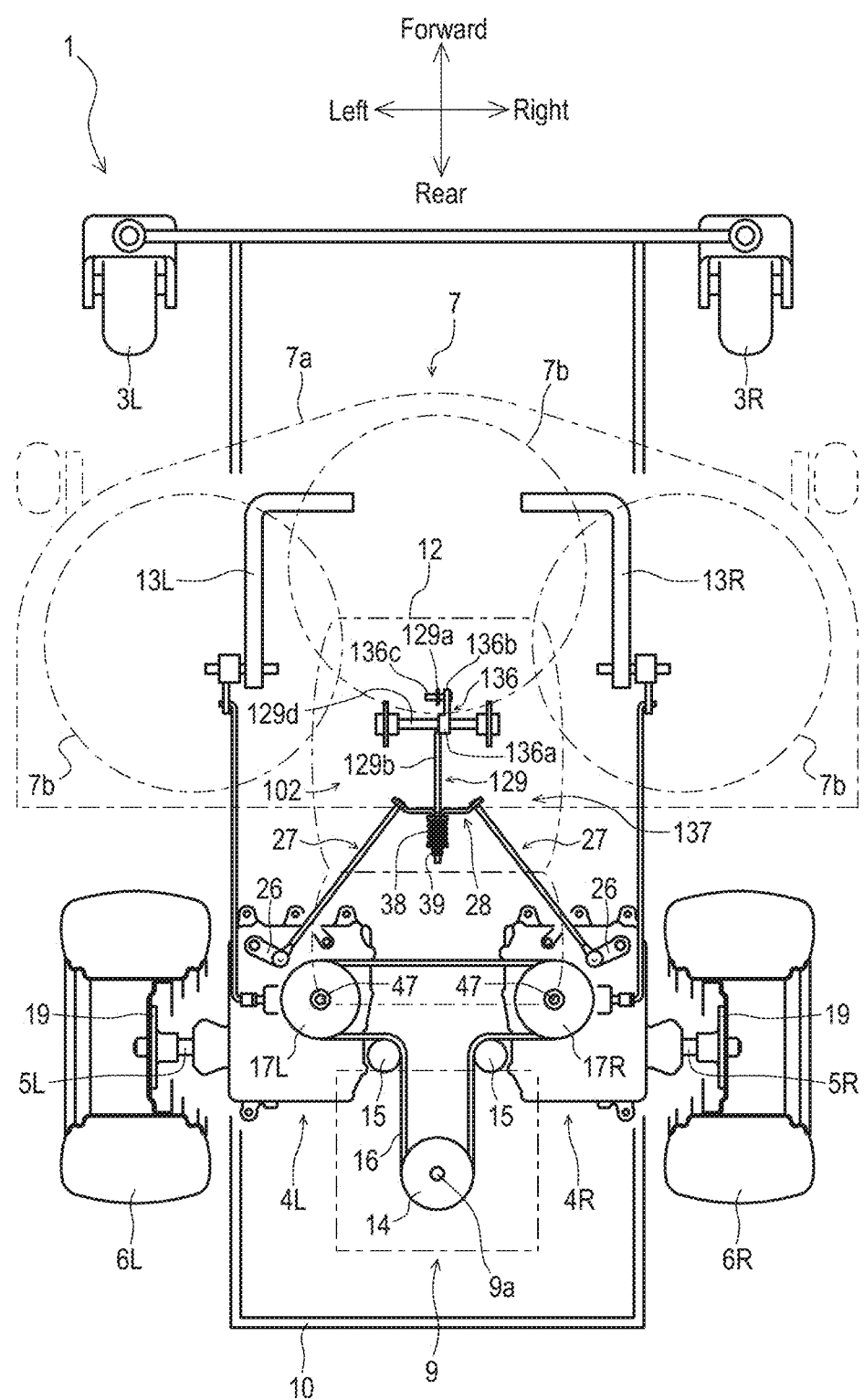
FIG. 12 is a plan view of the work vehicle with the parking brake apparatus according to the second embodiment.

As shown in FIGS. 11 and 12, a parking brake apparatus 102 according to the second embodiment includes a parking brake pedal 20, wet brake mechanisms 21, brake arms 26, auxiliary brake rods 27, an equalizer 28, a principal brake rod 129, and an electric actuator 130. The parking brake apparatus 102 is identical to the above-described parking brake apparatus 2 in configuration other than the principal brake rod 129 and the electric actuator 130. For the configuration of the electric actuator 130, a description of parts that do not differ from those described in FIG. 8A will be omitted.

The principal brake rod 129 includes a first principal brake rod 129a, a second principal brake rod 129b, a bell crank 129c, and a bell crankshaft 129d. The first principal brake rod 129a is disposed vertically with a first end connected to a displacement portion 136 of the electric actuator 130, and a second end connected to the bell crank 129c relatively rotatably. The second principal brake rod 129b is disposed horizontally with a first end connected to the equalizer 28, and a second end connected to the bell crank 129c relatively rotatably. The bell crank 129c is swingably supported about the bell crankshaft 129d that is axially supported horizontally with respect to the right-left direction of the work vehicle 1. The bell crank 129c has a substantially L-shaped form, and is swingably supported in a position with a first side facing in the forward direction of the work vehicle 1 and a second side facing in the downward direction of the work vehicle 1, by the bell crankshaft 129d in the vicinity of a contact point of the two sides.

The electric actuator 130 is a device serving as a drive source of the parking brake apparatus 102, and is disposed in a position closer to a driver's seat 12 above than the electric actuator 30 described in the first embodiment. By tilting the driver's seat 12 as shown by a chain line and providing an opening (not shown) on the seat installation side, the electric actuator 130 can be easily accessed. Also, during travel, the electric actuator 130 can be protected from splashes of muddy water.

As shown in FIG. 13, the displacement portion 136 of the electric actuator 130 is a part rotatable about the axis of an output shaft 135 disposed laterally horizontally, and includes a boss 136a, an arm 136b, and a shaft 136c. With the forward or reverse rotation of the output shaft 135, the displacement portion 136 is displaced in the up-down direction from a first position (c) to a second position (d) or from the second position (d) to the first position (c) at an angle (range) from about −135 degrees to 135 degrees, drawing an arc-shaped locus. Consequently, the first principal brake rod 129a connected to the shaft 136c is displaced substantially in the up-down direction in accordance with the movement of the arm 136b and the shaft 136c. Reference numeral 136d denotes a pin that defines the angle (range). In the parking brake apparatus 102, the auxiliary brake rods 27, the equalizer 28, and the principal brake rod 129 constitute a link mechanism 137 that connects the brake arms 26 and the electric actuator 130.

Next, the operation of the parking brake apparatus 102 will be described.

In the parking brake apparatus 102, when the driver performs an operation of depressing the parking brake pedal 20 (that is, artificially provides a parking instruction), the electric actuator 130 is actuated, and the displacement portion 136 rotates in a direction to apply the brakes about the output shaft 135 (in a direction of an arrow a in FIG. 13). When the displacement portion 136 rotates about the output shaft 135, the arm 136b is displaced, drawing an arc-shaped locus. According to the amount of displacement in the upward direction in that displacement, the first principal brake rod 129a is displaced in the upward direction. When the first principal brake rod 129a is displaced in the upward direction, the bell crank 129c is rotated, and the second principal brake rod 129b and the equalizer 28 are displaced in the forward direction accordingly. When the second principal brake rod 129b and the equalizer 28 are displaced in the forward direction, the pair of auxiliary brake rods 27 and 27 connected to the equalizer 28 are displaced in the forward direction by the same amount of displacement. When the auxiliary brake rods 27 and 27 are displaced in the forward direction, the brake arms 26 and 26 of the transaxles 4R and 4L are rotated to braking positions, whereby the brakes of the parking brake apparatus 102 become effective.

When the driver performs an operation of depressing the parking brake pedal 20 again (that is, artificially cancels the parking instruction), the parking brake pedal 20 is unlocked to return to a position before being depressed (release position), and the displacement portion 136 rotates about the output shaft 135 in a direction opposite to the direction when the electric actuator 130 causes the brakes of the parking brake apparatus 102 to work (a direction of an arrow β in FIG. 13). When the displacement portion 136 rotates backward about the output shaft 135, the first principal brake rod 129a is displaced in the downward direction, the bell crank 129c is rotated, and the second principal brake rod 129b and the equalizer 28 are displaced in the backward direction accordingly. When the second principal brake rod 129b and the equalizer 28 are displaced in the backward direction, the pair of auxiliary brake rods 27 and 27 connected to the equalizer 28 are displaced in the backward direction by the same amount of displacement. When the auxiliary brake rods 27 and 27 are displaced in the backward direction, the brake arms 26 and 26 of the transaxles 4R and 4L are rotated to brake release positions, whereby the parking brake apparatus 102 is released.

In the parking brake apparatus 102 of this configuration, the electric actuator 130 can be provided at a height different from that of the equalizer 28, which can increase the degree of freedom in the disposition of the electric actuator 130. For example, the electric actuator 130 can be disposed in an easily accessible position directly below the seat to improve maintainability. By disposing the electric actuator 130 in a higher position, the electric actuator 130 is less prone to being covered with mud, dust, and the like, and is improved in durability.

It is understood by those skilled in the art that the above descriptions are recommended examples of the disclosed apparatus, and that various modifications are possible in the present invention as long as they do not depart from the spirit and scope defined in the claims.

What is claimed is:

1. A parking brake apparatus for a vehicle, comprising:
    brake units for restricting rotation of right and left axles, wherein the brake units comprise brake arms;
    a brake operating portion configured to provide a parking instruction;
    an electric actuator having a displacement portion that is displaced in response to the parking instruction; and
    a link mechanism connecting the displacement portion of the electric actuator and the brake arms, the link mechanism comprising:
        a first auxiliary rod connected at a first end portion of the first auxiliary rod to the brake arm on one side of the vehicle;
        a second auxiliary rod connected at a first end portion of the second auxiliary rod to the brake arm on the other side of the vehicle;
        an equalizer having first and second end portions to which a second end portion of the first auxiliary rod and a second end portion of the second auxiliary rod are connected, respectively, wherein the equalizer is connected to the electric actuator;
        a principal rod connected at a first end portion of the principal rod to a central portion of the equalizer and connected at a second end portion of the principal rod to the displacement portion of the electric actuator;
        a first elastic member interposed between the first end portion of the equalizer and the second end portion of the first auxiliary rod; and a second elastic member interposed between the second end portion of the equalizer and the second end portion of the second auxiliary rod,
wherein the link mechanism is configured to allow the equalizer to swing about a vertical axis, and
wherein the parking brake apparatus is configured to simultaneously apply or release braking pressure from the brake units.

2. The parking brake apparatus for the vehicle according to claim 1,
wherein the link mechanism further comprises an elastic member interposed between a central portion of the equalizer and the first end portion of the principal rod.

3. The parking brake apparatus for the vehicle according to claim 1, wherein the displacement portion of the electric actuator is configured to be rotated, between two positions, about an axis in a right-left direction of the vehicle, such that a position of the second end portion of the principal rod displaces between two positions along a front-back direction of the vehicle.

4. The parking brake apparatus for a vehicle according to claim 1, wherein the link mechanism further comprises:
a first principal rod extending along a front-back direction of the vehicle and connected at a first end portion to a substantially central portion of the equalizer;
a second principal rod extending along an up-down direction of the vehicle and connected at a first end portion to the displacement portion of the electric actuator; and
a bell crank connecting a second end portion of the first principal rod and a second end portion of the second principal rod.

5. The parking brake apparatus for the vehicle according to claim 4, wherein the link mechanism further comprises:
an elastic member interposed between a central portion of the equalizer and the first end portion of the principal rod.

6. The parking brake apparatus for the vehicle according to claim 4, wherein the displacement portion of the electric actuator is configured to be rotated, between two positions, about an axis in a right-left direction of the vehicle, such that a position of the second end portion of the principal rod displaces between two positions along a front-back direction of the vehicle.

7. A parking brake apparatus for a vehicle, comprising:
brake units for restricting rotation of right and left axles, wherein the brake units comprise brake arms;
a brake operating portion configured to provide a parking instruction;
an electric actuator having a displacement portion that is displaced in response to the parking instruction; and
a link mechanism connecting the displacement portion of the electric actuator and the brake arms, the link mechanism comprising:
a first auxiliary rod connected at a first end portion of the first auxiliary rod to the brake arm on one side of the vehicle;
a second auxiliary rod connected at a first end portion of the second auxiliary rod to the brake arm on the other side of the vehicle;
an equalizer having first and second end portions to which a second end portion of the first auxiliary rod and a second end portion of the second auxiliary rod are connected, respectively, wherein the equalizer is connected to the electric actuator;
a principal rod connected at a first end portion of the principal rod to a central portion of the equalizer and connected at a second end portion of the principal rod to the displacement portion of the electric actuator; and
an elastic member disposed around the principal rod and interposed between a rear surface of a central portion of the equalizer and a spring receiver disposed at a tip of the first end portion of the principal rod,
wherein the link mechanism is configured to allow the equalizer to swing about a vertical axis, and
wherein the parking brake apparatus is configured to simultaneously apply or release braking pressure from the brake units.

8. The parking brake apparatus for the vehicle according to claim 7, wherein the displacement portion of the electric actuator is configured to be rotated, between two positions, about an axis in a right-left direction of the vehicle, such that a position of the second end portion of the principal rod displaces between two positions along a front-back direction of the vehicle.

9. The parking brake apparatus for a vehicle according to claim 7, wherein the link mechanism further comprises:
a first principal rod extending along a front-back direction of the vehicle and connected at a first end portion to a substantially central portion of the equalizer;
a second principal rod extending along an up-down direction of the vehicle and connected at a first end portion to the displacement portion of the electric actuator; and
a bell crank connecting a second end portion of the first principal rod and a second end portion of the second principal rod.

10. A parking brake apparatus for a vehicle, comprising:
brake units for restricting rotation of right and left axles, wherein the brake units comprise brake arms;
a brake operating portion configured to provide a parking instruction;
an electric actuator having a displacement portion that is displaced in response to the parking instruction;
a link mechanism connecting the displacement portion of the electric actuator and the brake arms, the link mechanism comprising:
a first auxiliary rod connected at a first end portion of the first auxiliary rod to the brake arm on one side of the vehicle;
a second auxiliary rod connected at a first end portion of the second auxiliary rod to the brake arm on the other side of the vehicle;
an equalizer having first and second end portions to which a second end portion of the first auxiliary rod and a second end portion of the second auxiliary rod are connected, respectively, wherein the equalizer is connected to the electric actuator by a principal rod that passes through a hole disposed in the equalizer such that a portion of the principal rod extends beyond the equalizer; and
an elastic member coupled to the link mechanism, wherein the elastic member is configured to elastically absorb over travel of the displacement portion of the electric actuator.

11. The parking brake apparatus for the vehicle according to claim 10, wherein the principal rod is connected at a first end portion of the principal rod to a central portion of the equalizer and connected at a second end portion of the principal rod to the displacement portion of the electric actuator.

12. The parking brake apparatus for the vehicle according to claim 11, wherein the elastic member comprises a spring that is interposed between a central portion of the equalizer and the first end portion of the principal rod, and wherein the link mechanism is configured to allow the equalizer to swing about a vertical axis.

13. The parking brake apparatus for the vehicle according to claim 11, wherein the elastic member comprises:

a first spring interposed between the first end portion of the equalizer and the second end portion of the first auxiliary rod; and a second spring interposed between the second end portion of the equalizer and the second end portion of the second auxiliary rod, wherein the link mechanism is configured to allow the equalizer to swing about a vertical axis.

14. The parking brake apparatus for a vehicle according to claim 10, wherein the principal rod further comprises:

a first principal rod extending along a front-back direction of the vehicle and connected at a first end portion to a substantially central portion of the equalizer;

a second principal rod extending along an up-down direction of the vehicle and connected at a first end portion to the displacement portion of the electric actuator; and a bell crank connecting a second end portion of the first principal rod and a second end portion of the second principal rod.

15. The parking brake apparatus for the vehicle according to claim 14, wherein the elastic member comprises a spring that is interposed between a central portion of the equalizer and the first end portion of the principal rod, and wherein the link mechanism is configured to allow the equalizer to swing about a vertical axis.

16. The parking brake apparatus for the vehicle according to claim 14, wherein the elastic member comprises:

a first spring interposed between the first end portion of the equalizer and the second end portion of the first auxiliary rod; and a second spring interposed between the second end portion of the equalizer and the second end portion of the second auxiliary rod, wherein the link mechanism is configured to allow the equalizer to swing about a vertical axis.

* * * * *

UNITED STATES PATENT AND TRADEMARK OFFICE
CERTIFICATE OF CORRECTION

PATENT NO. : 11,125,291 B2
APPLICATION NO. : 16/247101
DATED : September 21, 2021
INVENTOR(S) : Matsuura et al.

It is certified that error appears in the above-identified patent and that said Letters Patent is hereby corrected as shown below:

In the Claims

In Column 13, Claim 4, Line 22, change "a" to -- the --.

In Column 14, Claim 9, Line 21, change "a" to -- the --.

In Column 14, Claim 10, Line 38, change "instruction;" to -- instruction; and --.

In Column 15, Claim 14, Line 15, change "a" to -- the --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*